US007605110B2

(12) United States Patent
Yamada et al.

(10) Patent No.: US 7,605,110 B2
(45) Date of Patent: Oct. 20, 2009

(54) CERAMIC BODY, CERAMIC CATALYST BODY AND RELATED MANUFACTURING METHODS

(75) Inventors: Keiichi Yamada, Toyoake (JP);
Kazuhiko Koike, Okazaki (JP);
Katsumi Yoshida, Nagoya (JP); Hideki Kita, Nagoya (JP); Naoki Kondo, Nagoya (JP); Hideki Hyuga, Nagoya (JP)

(73) Assignees: Denso Corporation, Kariya (JP);
Nippon Soken, Inc., Nishio (JP)

( * ) Notice: Subject to any disclaimer, the term of this patent is extended or adjusted under 35 U.S.C. 154(b) by 156 days.

(21) Appl. No.: 11/783,100

(22) Filed: Apr. 5, 2007

(65) Prior Publication Data

US 2007/0254808 A1    Nov. 1, 2007

(30) Foreign Application Priority Data

Apr. 5, 2006 (JP) .............................. 2006-104708

(51) Int. Cl.
| | | |
|---|---|---|
| B01J 21/00 | (2006.01) |
| B01J 21/06 | (2006.01) |
| B01J 21/10 | (2006.01) |
| B01J 21/12 | (2006.01) |
| B01J 23/00 | (2006.01) |
| B01J 23/02 | (2006.01) |
| B01J 23/38 | (2006.01) |
| C01B 13/14 | (2006.01) |
| C01B 33/20 | (2006.01) |
| C01B 33/26 | (2006.01) |
| C01F 1/00 | (2006.01) |
| C01F 7/00 | (2006.01) |
| C03C 10/04 | (2006.01) |
| C03C 10/06 | (2006.01) |
| C03C 10/08 | (2006.01) |
| C04B 35/00 | (2006.01) |
| C04B 35/14 | (2006.01) |
| C04B 35/16 | (2006.01) |
| C04B 35/18 | (2006.01) |
| C04B 35/185 | (2006.01) |
| C04B 35/195 | (2006.01) |
| C04B 35/622 | (2006.01) |
| C04B 35/64 | (2006.01) |

(52) U.S. Cl. .................... 502/439; 502/60; 502/63; 502/64; 502/66; 502/67; 502/68; 502/70; 502/72; 502/73; 502/74; 502/87; 502/240; 502/242; 502/250; 502/251; 502/252; 502/254; 502/258; 502/261; 502/263; 502/325; 502/326; 502/327; 502/328; 502/332; 502/340; 502/341; 502/351; 502/355; 501/5; 501/8; 501/9; 501/108; 501/112; 501/118; 501/119; 501/122; 501/133; 501/141; 501/153; 501/154; 423/327.2; 423/328.1; 423/328.2; 423/330.1; 423/331; 423/593.1; 423/594.1; 423/594.13; 423/594.16; 423/594.2; 423/598; 423/599; 423/600; 423/700

(58) Field of Classification Search ............ 502/60, 502/3, 64, 66–68, 70, 72–74, 87, 305, 306, 502/308, 309, 313, 314, 316, 325, 328, 332, 502/340, 355, 240, 242, 250, 251, 252, 254, 502/258, 261, 263, 323, 326, 327, 341, 351, 502/439, 527, 19; 501/5, 8, 9, 108, 112, 501/118, 119, 141, 153, 154, 122, 133; 423/327.2, 423/328.1, 328.2, 330.1, 331, 593.1, 594.1, 423/594.2, 594.13, 594.16, 700, 598, 599, 423/600

See application file for complete search history.

(56) References Cited

U.S. PATENT DOCUMENTS

| | | | |
|---|---|---|---|
| 6,887,826 B2 | 5/2005 | Nishimura et al. | |
| 7,048,894 B2 | 5/2006 | Tanaka et al. | |
| 7,067,452 B2 | 6/2006 | Tanaka et al. | |
| 2003/0100446 A1* | 5/2003 | Hase et al. | ........ 502/302 |
| 2003/0109383 A1 | 6/2003 | Koike et al. | |
| 2003/0151155 A1 | 8/2003 | Muroi et al. | |
| 2004/0131512 A1 | 7/2004 | Abe et al. | |
| 2005/0046063 A1 | 3/2005 | Toda et al. | |
| 2005/0163675 A1 | 7/2005 | Nishimura et al. | |

FOREIGN PATENT DOCUMENTS

| | | |
|---|---|---|
| EP | 1 043 067 A2 | 10/2000 |
| JP | 62-4441 A | 1/1987 |
| JP | 2001-310128 | 11/2001 |
| JP | 2002-119870 | 4/2002 |
| JP | 2002-172329 | 6/2002 |
| JP | 2002-355511 | 12/2002 |
| JP | 2003-025316 | 1/2003 |
| JP | 2003-80080 A | 3/2003 |
| JP | 2003-212672 | 7/2003 |
| JP | 2003-230838 A | 8/2003 |
| JP | 2003-321280 | 11/2003 |

\* cited by examiner

*Primary Examiner*—Timothy C Vanoy
*Assistant Examiner*—Serena L Hanor
(74) *Attorney, Agent, or Firm*—Nixon & Vanderhye, P.C.

(57) ABSTRACT

A ceramic body, a ceramic catalyst body, a ceramic catalyst body and related manufacturing methods are disclosed wherein a cordierite porous base material has a surface, formed with acicular particles made of a component different from that of cordierite porous base material, which has an increased specific surface area with high resistance to a sintering effect. The ceramic body is manufactured by preparing a slurry containing an acicular particle source material, preparing a porous base material, applying the slurry onto a surface of the porous base material and firing the porous base material, whose surface is coated with the slurry, to cause acicular particles to develop on the surface of the porous base material. A part of or a whole of surfaces of the acicular particles is coated with a constituent element different from that of the acicular particles.

56 Claims, 6 Drawing Sheets

CERAMIC BODY, CERAMIC CATALYST BODY AND RELATED MANUFACTURING METHODS

CROSS REFERENCE TO RELATED APPLICATIONS

This application is related to Japanese Patent Application No. 2006-104708, filed on Apr. 5, 2006, the content of which is hereby incorporated by reference.

BACKGROUND OF THE INVENTION

1. Technical Field of the Invention

The present invention relates to ceramic bodies and ceramic catalyst bodies and, more particularly, to a ceramic body, a ceramic catalyst body and related manufacturing methods, with the ceramic body having suitable applications to a three-way catalyst for motor vehicle, a combustion catalyst for gas turbine and a high-temperature purifying catalyst which are exposed to high temperatures above 800° C. and high-velocity gas streams for removing harmful compounds such as NOx or the like.

2. Description of the Related Art

In modern automotive engines, catalyst bodies such as three-way catalysts have heretofore been widely used for removing toxic compounds from exhaust gases emitted from internal combustion engines. Each three-way catalyst comprises an oxide-based honeycomb structural body for supporting a three-way catalyst. An attempt has heretofore been made to provide a cordierite porous body for use in the honeycomb structural body. The cordierite porous body is exposed to high temperatures of exhaust gases for prolonged periods of time with the resultant deterioration in a specific surface area due to a sintering effect.

In the related art, efforts have been devoted to developing the oxide-based honeycomb structural bodies for three-way catalysts, which have been put into practical application to the three-way catalyst for motor vehicles and combustion catalysts, etc., which are exposed to high temperatures for prolonged periods of time. Research and development work has been undertaken to provide oxide-based honeycomb structural bodies with further improved characteristics. Among these, especially, a cordierite is known as having a melting point of about 1400° C. with an extremely low thermal expansion coefficient and increased thermal shock resistance. Owing to these characteristics, the cordierite has been employed in honeycomb structural bodies as, for instance, catalyst carriers, exposed to high temperature areas at temperatures exceeding 800° C., for a three-way catalyst of a motor vehicle, a combustion catalyst for a gas turbine or a catalyst for purifying high temperature gases.

Thus, even though application availability of the cordierite as the catalyst carrier has been recognized in the related art, the related art manufacturing method is hard to manufacture a cordierite porous body having a high specific surface area and thermally stable characteristic. To overcome such a difficulty, efforts have been undertaken to provide a cordierite honeycomb structural body with increased thermal shock resistance as an exhaust gas purifying catalyst. The cordierite honeycomb structural body, having a catalyst carrier surface coated with a layer of gamma alumina and supporting a noble metal catalyst, has been widely used. The reason for the coated layer to be formed on the catalyst carrier surface resides in that the cordierite has a small specific surface area and has a difficulty of supporting a catalyst component in required amounts with the surface structure remaining intact and the use of material with an increased specific surface area such as gamma alumina enables an increase in the specific surface area of the catalyst carrier.

However, coating a cell wall surface of the catalyst carrier with gamma alumina results in an increase in weight accompanied with an increase in thermal capacity. In recent years, various studies have heretofore been undertaken to decrease a thickness of the cell wall to lower the heat capacity with a view of activating the catalyst on an earlier stage. With the coated layer being formed, an issue occurs with an effect of the cell wall decreasing by half. Thus, a need has been arisen to improve such a defect. Further, with the coated layer being formed on the cell wall surface, a remarkable reduction occurs in an opening space of each cell, causing an increase in a pressure loss. In addition, each cell has a greater thermal expansion coefficient than that of the catalyst carrier merely composed of the cordierite. Moreover, a transition takes place from gamma alumina to alpha alumina when the cell is exposed to high temperatures above 1000° C. In addition, with the cell exposed to such high temperatures, a sintering effect proceeds on the cell, causing an issue to occur with a difficulty of keeping a high specific surface area.

Research and development work has been done with the present inventors in success to provide cordierite porous bodies each formed with cordierite acicular crystals in the order of submicron diameters as disclosed in Japanese Patent Application Publication No. 2003-321280, U.S. Patent Application Publication Nos. 2003/151155, 2004/131512, U.S. Pat. No. 6,887,826, Japanese Patent Application Publication No. 2002-119870, U.S. Pat. No. 7,067,452 and EP1043067A2. These include the honeycomb structural bodies each including the cordierite porous body, which is directly utilized intact, and the honeycomb structural bodies each including the cordierite porous body whose inner wall has a coated layer.

There has been no choice but to employ a method of coating a layer of gamma alumina or the like on the inner wall of the honeycomb structural body when using the cordierite to an area exposed at high temperatures. Therefore, various efforts have heretofore been devoted to developing a ceramic body that can support a catalyst component with no formation of the coated layer. One of these technologies is disclosed in Japanese Patent Application Publication No. 62-004441. With a manufacturing method disclosed in this technology, a cordierite body is prepared and subjected to, for instance, acid treatment, upon which the cordierite body is subjected to heat treatment, thereby causing the cordierite body to have an increased specific surface area. However, such a manufacturing method undergoes an issue with the occurrence of deteriorations in structure wherein a crystal lattice of the cordierite are ruptured due to acid treatment and heat treatment with the resultant reduction in strength. Thus, such a cordierite body has been impractical as a catalyst carrier.

To address such an issue, the present inventors have proposed a ceramic carrier with a structure as disclosed in U.S. Pat. No. 7,048,894. With the ceramic carrier disclosed in this Patent Publication, the structure of the ceramic carrier has a capability of supporting a catalyst component in required amounts with no need for a coated layer to be formed for providing an improved specific surface area.

The ceramic carrier is composed of substrate ceramic materials including constituent elements and at least one kind of or multiple kinds of the constituent elements a part of which are replaced by other elements than the constituent elements of the substrate ceramic material. That is, the ceramic carrier is dipped into a solution of noble metal compounds such as hexachloroplatinic acid, platonic chloride, rhodium chloride, etc. Then, the ceramic carrier is fired, thereby making it possible to directly support the noble metal catalyst on the replaced elements. This ceramic carrier has higher strength and durability than those of the related art catalyst carrier formed with vacant pores upon acid treatment and heat treatment.

Another attempt has been made to provide a ceramic catalyst as proposed in U.S. Patent Application Publication No. 2003/109383. With the ceramic catalyst disclosed in this Patent Publication, the ceramic catalyst includes a ceramic carrier capable of directly supporting a catalyst component. The ceramic carrier has a carrier surface on which a main catalyst component and sub catalyst components are directly supported. In directly supporting the main catalyst component and the sub catalyst components on the carrier surface, the main catalyst component is supported on the carrier surface in advance on which the sub catalyst components are subsequently supported, thereby providing a catalyst body that is hard to suffer thermal deactivation.

Under such circumstances, the present inventor have dedicated their keen efforts on accumulative research and development work toward a goal of developing a catalyst-support cordierite honeycomb structure that makes it possible to achieve a radical solution on various issues encountered in the related art on the ground of the related art technologies.

As a result of such accumulative research and development work, the present inventors have developed new insights on improvement of the catalyst-support cordierite honeycomb structure.

That is, acicular particles can be developed on a cordierite base material on a particular technology. Then, coating a part of or a whole of the acicular particles with a constituent element different from that of the acicular particles makes dramatic improvements in a specific surface area.

Such a structure allows the acicular particles to be stable even under high temperature environments. This makes it possible to dramatically suppress the occurrence of a reduction in the specific surface area due to a sintering effect. Coating surfaces of the acicular particles with a layer capable of supporting a catalyst enables the realization of a ceramic catalyst body having an excellent catalytic performance. This makes it unnecessary to apply the inner wall of the honeycomb structure with a layer of gamma alumina as required in the related art manufacturing method.

SUMMARY OF THE INVENTION

The present invention has been completed with the above view in mind and has an object to provide a ceramic body with characteristic stable at high temperatures and having a high specific surface area for supporting a catalyst, and a ceramic catalyst body incorporating the ceramic body as a catalyst carrier with an excellent catalytic performance.

It is another object of the present invention to provide a ceramic porous body composed of a base material including a noble cordierite porous body, having a high specific surface area and capable of suppressing a reduction in a specific surface area even exposed to heat treatments at high temperatures above 1000° C., a honeycomb structural body, related manufacturing methods and a ceramic catalyst as a product.

That is, the present invention has an object to provide a technology of manufacturing a noble cordierite porous body, which makes it possible to manufacture a ceramic body, including a base material composed of a cordierite porous body having a high specific surface area with increased heat resistance performance that makes it possible to minimize a reduction in a specific surface area due to a sintering effect even when exposed to a high temperature environment above 800° C. for prolonged periods of time, and a catalyst-support honeycomb structural body directly formed with such a porous cordierite, and a product incorporating such a noble cordierite porous body.

The present invention is useful in realizing a method of manufacturing a ceramic body, composed of a base material including a cordierite porous body having a capability of suppressing a reduction in a specific surface area caused by a sintering effect, and a cordierite honeycomb having a wall surface on which by applying a layer of coating solution or the like, acicular particles are developed while providing a method of manufacturing these structures at low cost.

To achieve the above object, the present invention has various features as listed below:

(1) A ceramic body, for use in a fluid stream, comprises a porous base material composed of a constituent element, and acicular particles formed on a surface of the porous base material and composed of a component different from the constituent element of the porous base material.

(2) The acicular particles may preferably comprise polycrystalline structures each formed with a finely unleveled pattern.

(3) The acicular particles may preferably have surfaces partly or entirely formed with coated layers.

(4) The constituent element of the porous base material may preferably be a cordierite.

(5) The acicular particles may preferably be composed of a mullite.

(6) The coated layers covered on the surfaces of the acicular particles may preferably contain a substance including at least one of Si and Al elements.

(7) The coated layers covered on the surfaces of the acicular particles may preferably contain a substance composed of cordierite.

(8) The coated layers covered on the surfaces of the acicular particles may preferably contain a substance composed of cordierite having a crystal lattice formed of elements a part of which is replaced by at least one of W and Ti elements.

(9) The porous base material may preferably have a porosity equal to or greater than 30%.

(10) The acicular particles may preferably have an average particle diameter equal to or less than 1 µm.

(11) The acicular particles may preferably have an aspect ratio equal to or greater than 5.

(12) The ceramic body may preferably have a shape of at least one of a powder, a pellet, a nonwoven fabric, a woven cloth, a fiber and a honeycomb.

(13) The ceramic body may preferably have a specific surface area equal to or greater than 1 $m^2/g$.

(14) A ceramic catalyst body comprises the ceramic body on which a catalyst component is supported.

(15) The catalyst component may preferably be supported on the ceramic body by chemical bonding.

(16) The catalyst component may preferably include a noble metal.

(17) A method of manufacturing a ceramic body comprises the steps of preparing a slurry containing an acicular particle source material, preparing a porous base material, applying the slurry onto a surface of the porous base material, firing the porous base material, whose surface is coated with the slurry, to cause acicular particles to develop on the surface of the porous base material, and covering a part of or a whole of surfaces of the acicular particles with a constituent element different from that of the acicular particles.

(18) The step of preparing the slurry containing the acicular particle source material may preferably include preparing a source component available to be developed into the acicular particles upon firing, and preparing the slurry using the source component available to be developed into the acicular particles, the step of covering the slurry onto the surface of the porous base material includes applying the slurry onto the surface of the porous base material by dipping or coating, and the step of firing the porous base material causes the source component, contained in the slurry coated on the surface of the porous substrate, to develop on the surface of the porous substrate as the acicular particles.

(19) The acicular particles developed on the surface of the porous substrate may preferably include polycrystalline acicular mullite particles each formed with a finely unleveled pattern.

(20) The method of manufacturing the ceramic body may preferably further comprises the step of applying a catalyst component onto the surface of the ceramic body to be supported thereon.

(21) A ceramic body for use in an exhaust gas purifying catalyst or a filter comprises a cordierite porous body made of a cordierite, and acicular particles formed on a surface of the cordierite porous body and composed of a component different from the cordierite.

(22) A ceramic catalyst body for use as an exhaust gas purifying catalyst comprises a cordierite honeycomb structural body composed of a porous body made of a cordierite, and polycrystalline acicular mullite particles, formed on a surface of the cordierite porous body, each of which has an unleveled pattern and supports thereon a catalyst.

(23) A method of manufacturing a ceramic catalyst body, comprises the steps of preparing a slurry composed of a solution dispersed with acicular mullite particles, preparing a cordierite porous base material, applying the slurry onto a surface of the cordierite porous base material, firing the cordierite porous base material, whose surface is coated with the slurry, to cause acicular mullite particles to develop on the surface of the cordierite porous base material for thereby providing a catalyst carrier having a surface formed with the acicular mullite particles, applying a part of or a whole of surfaces of the acicular mullite particles with a component different from the acicular mullite particles, and supporting a catalyst on the catalyst carrier.

DETAILED DESCRIPTION OF PREFERRED EMBODIMENTS

Now, a ceramic body, a ceramic catalyst body and related manufacturing methods of various embodiments according to the present invention are described below in detail with reference to the accompanying drawings. However, the present invention is construed not to be limited to such embodiments described below and technical concepts of the present invention may be implemented in combination with other known technologies or the other technology having functions equivalent to such known technologies.

In one aspect of the present invention, a ceramic body is provided which has an application to an exhaust gas purifying catalyst or a porous base material to be used as a filter. The ceramic body is made of a porous base material having a surface formed with acicular particles exposed to exhaust gases in contact therewith. The acicular particles are composed of a constituent element different from that of a principal component of the porous base material.

In another aspect of the present invention, a ceramic catalyst structural body is provided which comprises a ceramic body on which a catalyst component is supported.

Still another aspect of the present invention provides a method of manufacturing a ceramic body. The manufacturing method comprises the step of preparing a slurry containing acicular particles, preparing a porous base material formed in a compact, applying the slurry onto a surface of the compact by coating or dipping, firing the compact to allow the acicular particles to develop on the surface of the compact, and applying a part of or a whole of surfaces of the acicular particles with a constituent element different from that of the acicular particles.

A further aspect of the present invention relates to a method of manufacturing a ceramic catalyst structural body. The manufacturing method comprises the step of preparing a ceramic body, and applying the ceramic body with a catalyst component to be carried thereon.

The present invention features the provision of a ceramic body, having application to an exhaust gas purifying catalyst or a filter, a ceramic catalyst body and related manufacturing methods.

Figure 5:
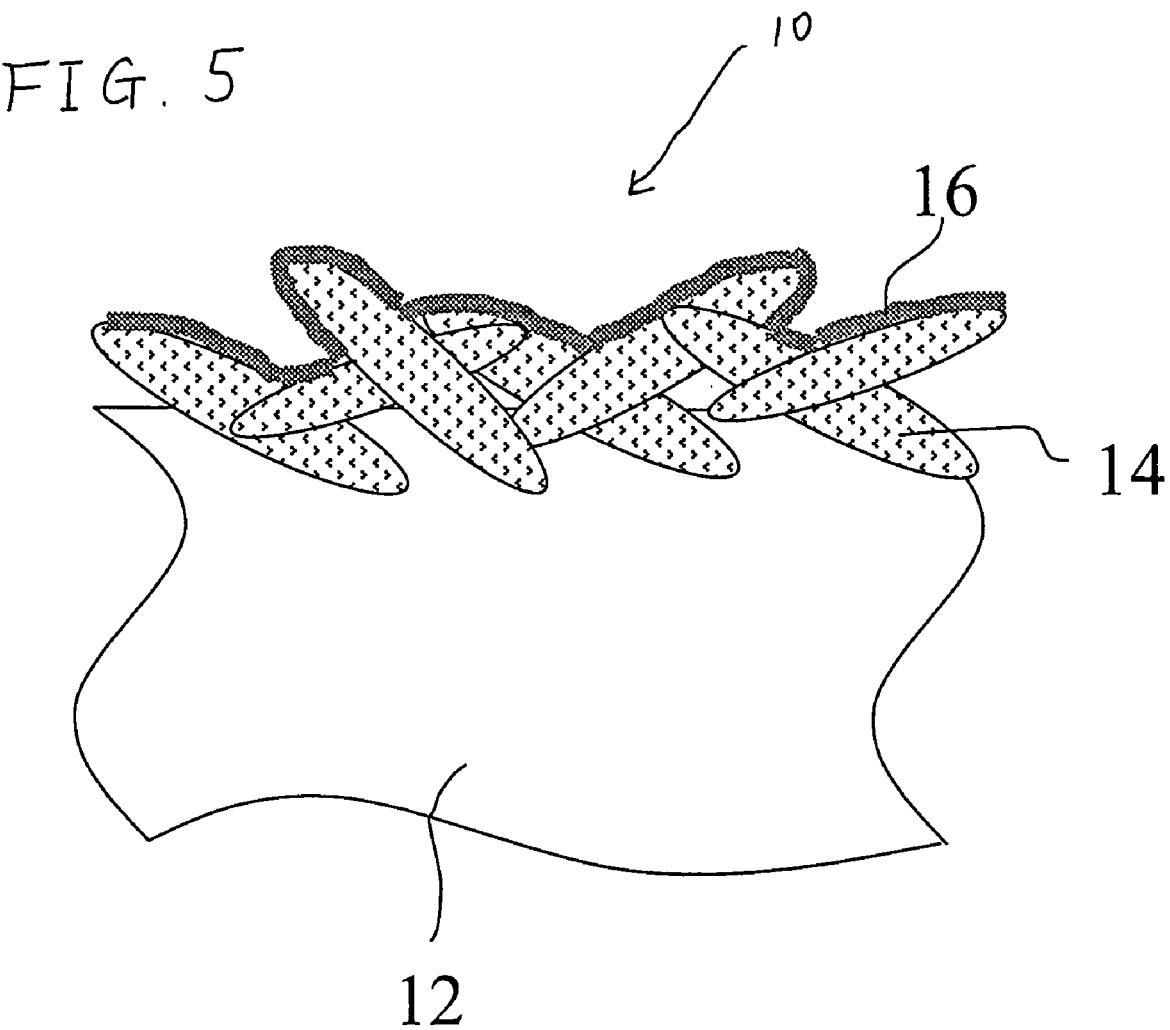
FIG. 5 is a cross sectional view showing a ceramic body of an embodiment according to the present invention.

FIG. 5 is a cross sectional view schematically showing a typical representation of the ceramic body of the embodiment according to the present invention.

As shown in FIG. 5, the ceramic body 10 comprises a cordierite porous body 12, acting as a porous base material, acicular particles 14 formed on a surface of the cordierite porous body 12, and a coated layer 16 composed of a component different from that of the porous base material 12 and coated on a part of or a whole of the acicular particles 14.

Next, a method of manufacturing a ceramic body according to the present invention will be described below in detail with reference to FIG. 6.

Figure 6:
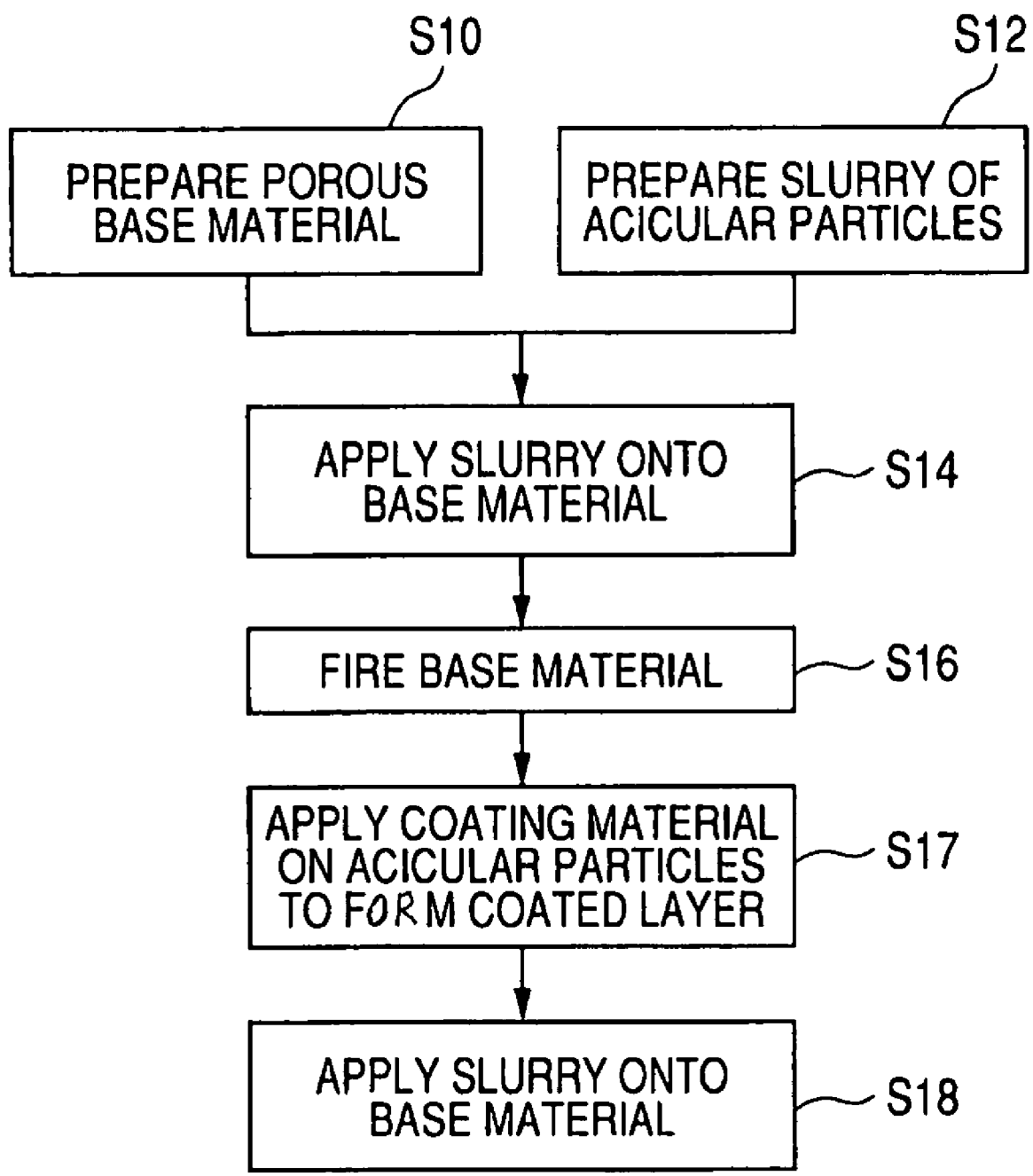
FIG. 6 is a block diagram showing a basic sequence in carrying out a method of manufacturing the ceramic body shown in FIG. 5.

In preparing the ceramic body of the present embodiment, as shown in FIG. 6, a porous base material is prepared in S10 in a compact in a manner as will be described below in detail. Then, slurry is prepared in step S12 by mixing a solution and acicular particles or acicular particle yielding precursors. Slurry is applied onto the compact of the porous base material in step S14 by coating or dipping. The compact is then fired in S16 at high temperatures to cause the acicular particles to develop on a surface of the compact. Subsequently, a part of or a whole of surfaces of the acicular particles are applied with a coated layer in step S18, which is composed of a constituent element different from that of the acicular particles. Thereafter, a catalyst is applied onto and supported with the coated layer in step S20.

Examples of a method of causing the acicular particles to develop on the surface of the porous base material may include, for instance, a method of coating or spraying the slurry, containing acicular particles or a component available to develop as the acicular particles, onto the base material, and a method of utilizing a hydrolysis reaction of a sol-gel solution applied to an inside of a honeycomb structure formed in the porous base material.

First, the ceramic body of the present embodiment will be described below in detail.

With the present invention, in preparing the cordierite porous body, starting substances are employed as the porous base materials and include starting powders, which are blended and formulated in a cordierite composition. In particular, the starting substances may include constituent elements selected from the group consisting of kaolin, talc, alumina and silica powders. These powders are weighed and formulated in the cordierite composition. During such preparation, carbon containing components such as, for instance, carbon blacks or the like, are added as pore-forming materials to the cordierite composition. The amount of pore-forming materials to be added may vary according to a porosity rate to be targeted. Thus, the cordierite composition may include 5 to 30 weight % of carbon blacks or the like. This makes it possible to obtain a sintered body with a porosity rate equal to or greater than 30%, that is, for instance, in a value ranging from 38 to 55%.

Examples of the pore-forming material to be used in the present invention may include, for instance, carbon blacks, starch, phenol resin, polystyrene, etc. With the present invention, the starting powders and the pore-forming materials are subjected to, for instance, ball mill mixing. The resulting mixture slurry is dried using an evaporator or an oven, etc., thereby obtaining a dried product. The dried product is then pulverized and classified. Thereafter, the resulting powder is pressed and formed into a compact. The compact is fired at high temperatures ranging from 1200 to 1400° C. This enables a cordierite porous body to be formed in a cordierite crystalline phase in a submicron order.

With the present invention, further, the acicular particles may preferably include mullite as a component. In preparing the acicular particles, a sol-gel method is utilized. In the sol-gel method, alkoxides, available to develop to alumina and silica components, are weighed in a stoichiometric composition of mullite ($3Al_2O_3 \cdot 2SiO_2$) and alcohol is added thereto as a solvent. Examples of alkoxides may preferably include aluminum isoproxide and tetraethyl orthosilicate. Examples of the solvent may preferably include ethanol, to which the alkoxides are added to form a solution. This solution is heated and stirred using a hot stirrer. The stirring may be preferably conducted at a temperature of 50° C.

Upon stirring the solution to a sufficient extent, the solution is further heated at a high temperature of preferably 50° C. After the heating step, a suitable amount of pure water is added to the solution, which in turn is subjected to the stirring to be formed in a gel phase. The resulting gel is dried at a temperature in a range from 60 to 80° C., pulverized to form a acicular mullite precursor. The resulting precursor has acicular shapes formed in fine amorphous particles. The resulting precursor is subjected to heat treatment at a temperature in a range from 1200 to 1400° C. This allows the precursor to be crystallized in structure with finely unleveled configuration, thereby obtaining a multicrystalline acicular mullite with an average particle diameter less than 1 μm and an aspect ratio equal to or greater than 5.

With the present invention, the acicular particles may preferably have surfaces covered with substances including at least Si or Al. Examples of the covering substance may include cordierite that preferably contains second components available to directly carry catalyst components. Examples of the second components may include Cr, Mo, W, Co, Ti, Fe, Ga, Ni, etc. With the present invention, the coating of the objective substance is conducted by preparing a solution containing constituents of the objective substance and coating the acicular particles and heating the same.

In preparing the solution, for instance, alkoxides or nitrates of respective components are used, blended and adjusted so as to provide targeted components. Further, for adjusting homogeneous solution, an acid of, for instance, nitrate or the like may be preferably added. The acicular particles are covered with the solution and, thereafter, heated for promoting the crystallization. Varying a concentration of the covering solution and the number of times for covering the acicular particles makes it possible to change the amount of the solution to be covered on the surfaces of the acicular particles. Moreover, the surfaces of the acicular particles may be covered using, in addition to a solution method, a gas phase method and a solid phase method.

In manufacturing the ceramic body, ceramic base materials such as, for instance, kaolin, talc and silica powders with high purity, are blended in a cordierite composition as starting materials, to which pore-forming agent is added to form a precursor. Thereafter, the precursor is formed in a compact with a honeycomb structure or the like. The compact is fired in atmosphere at high temperatures in a range from 1200 to 1400° C. Subsequently, the resulting compact is covered with an alcohol type solution or water type solution dispersed with acicular mullite particles resulting from the sol-gel method and further fired again at high temperatures in a range from 1200 to 1400° C. to provide a sintered compact.

Thereafter, the sintered compact is covered with a component, containing at least Si or Al, by a solution technique using alkoxides or the like and fired at high temperatures in a range from 1200 to 1400° C. Such a process makes it possible to prepare a cordierite porous body having a feature in that covering layers, containing at least Si or Al, are formed on a part of or a whole of surfaces of the acicular particles. In addition, the firing step may be conducted on at least a final step and the other preceding firing steps may be omitted.

Examples of the method of causing the acicular particles to develop on the surface of the porous base material may include, for instance, a method of coating or spraying a slurry, containing acicular particles or a component available to develop into the acicular particles in a subsequent step, onto a base material, a method of utilizing a hydrolysis reaction of a sol-gel solution applied to an inside of a honeycomb structure formed in the porous base material, etc. With a view to improving adhesiveness of the acicular particles onto the porous base material and preventing the acicular particles from tightly bonding to each other, an appropriate amount of binder may be added to the acicular particles slurry. Examples of the binder may include, for instance, polyvinyl alcohol (PVA), polyvinyl butyral (PVB), and methylcellulose or the like.

As the acicular mullite particles are developed on a surface of the cordierite porous body acting as a base material of the ceramic body according to the present invention, the cordierite porous body has an increased specific surface area. In addition, the acicular mullite takes the form of a structure that is stable at high temperatures and resistant in progression of the sintering effect. Thus, even if the cordierite porous body is subjected to heat treatment at high temperatures, no deterioration occurs in the specific surface area of the base material per se due to progressing of the sintering effect. This makes it possible to manufacture a honeycomb structural body, acting as a catalyst carrier, directly from the cordierite porous body with a high-temperature stability and high specific surface area to serve as the base material of the ceramic body according to the present invention.

With the present invention, further, the cordierite porous body with the high-temperature stability and high specific surface area can be used as a honeycomb structural body for supporting catalyst. This completely avoids deteriorations from occurring in catalyst quality due to the sintering effect progressed in the gamma alumina coating layer or flaking thereof due to a usage in a high temperature environment for prolonged periods of time. This addresses the issues encountered in the products of the related art. With the present invention, furthermore, using the cordierite porous body with the high-temperature stability and high specific surface area as the honeycomb structural body for supporting the catalyst enables a honeycomb catalyst, carrying thereon noble metal catalyst, to be manufactured and provided at low cost.

As the acicular mullite particles are developed on the surface of the cordierite porous body, acting as the base material of the ceramic body according to the present invention, the acicular mullite particles are stable at high temperatures and resistant to the progression of the sintering effect even exposed at high temperatures for prolonged periods of time. Thus, even if the cordierite porous body is subjected to heat treatment at high temperatures for repeated number of cycles, no deterioration occurs in a specific surface area of the base material per se caused by the sintering effect.

In addition, the surfaces of the acicular particles may be formed with covering layers having catalyst supporting capabilities. With such treatment, a cordierite honeycomb structural body with catalyst supporting capability can be directly manufactured in a structure that is stable at high temperatures and has a high specific surface area. This makes it possible to provide a honeycomb structural body that can be preferably used as, for instance, the cordierite honeycomb structural body with catalyst supporting capability formed in a structure that is stable at high temperatures and has a high specific surface area.

The cordierite honeycomb structural body with catalyst supporting capability, fabricated in the method set forth above, can be preferably used a ceramic carrier body for use in an exhaust gas purifying catalyst or the like of an internal combustion. The ceramic carrier body can support catalyst components on, for instance, fine pores formed in the cordierite honeycomb structural body and the surfaces of the acicular particles formed in honeycomb inner walls without intervening coated layers of gamma alumina. Examples of catalyst component may include at least one kind of metals having catalytic ability and oxides of metals having catalytic ability.

Examples of metal having catalytic ability may include noble metals such as, for instance, Pt (Platinum), Pd (Palladium), Rh (Rhodium), etc. Examples of the oxides of metals having catalytic ability may include an oxide containing at least more than one metal among metals including V (Vanadium), Nb (Niobium), Ta (Tantalum), Cr (Chromium), Mo (Molybdenum), W (Tungsten), Mn (Manganese), Fe (Ferrite), Co (Cobalt), Ni (Nickel), Cu (Copper), Zn (Zinc), Ga (gallium), Sn (Tin), Pb (Lead), etc. In addition, examples of co-catalyst may include one kind of lanthanoid element, transition metal element, alkali metal element and alkali earth metal element, oxides thereof and composite oxides thereof, and a plurality of kinds of these components may be used at the same time.

Examples of a method of supporting the catalyst components may include, for instance, a liquid phase method in which the catalyst components are dissolved into a solvent upon which the cordierite honeycomb structural body is impregnated with the solvent to support the catalyst components and, in addition, a gas phase method such as a CVD (Chemical Vapor Deposition) method and a PVD (Physical Vapor Deposition) method or the like, a method of using supercritical fluid, etc. Although the liquid phase method may include water as a solvent, the liquid phase method may preferably include a solvent, which is lower in surface tension than that of water, such as alcohols solvent such as methanol or the like.

The ceramic catalyst body according to the present invention, manufactured in such a process mentioned above, has no need to have a ceramic support surface formed with a coated layer of gamma alumina. That is, the ceramic catalyst body includes the catalyst components in required amounts that are directly supported within narrowed distances with increased purifying performance.

With the porous carrier body of the related art for use in the exhaust gas purifying catalyst, an attempt has been made to cover the carrier surface with gamma alumina. This causes an increase in weight with the resultant increase heat capacity. In addition, a transition occurs from gamma alumina to alpha alumina at temperatures above 1000° C. and a sintering effect progresses in the porous carrier body. This causes an issue to arise with deterioration in catalyst. Thus, such an issue needs to be addressed.

On the contrary, the ceramic catalyst body implementing the present invention includes the porous base material having the surface on which the acicular particles, having the constituent elements different from that of the base material, can be developed in a structure that is stable at high temperatures. This makes it possible to structure and provide a ceramic body, which has catalyst supporting capability and stability at high temperatures while having a high specific surface area, and a ceramic catalyst body.

ADVANTAGEOUS EFFECTS OF THE PRESENT INVENTION

From the foregoing description, a number of advantages of the ceramic body, the ceramic catalyst body and the ceramic honeycomb structural body implementing the present invention become evident:

(1) The ceramic body, the ceramic catalyst body and the ceramic honeycomb structural body can be provided and include the cordierite porous body having the high specific surface area.

(2) The ceramic body has the base material whose surface is formed with the acicular particles that are stable at high temperatures. Therefore, even if the ceramic body is exposed to high temperatures above, for instance, 1000° C. for prolonged periods of time, no deterioration takes place in the specific surface area due to the sintering effect.

(3) Applying the surfaces of the acicular particles with the coating having catalyst supporting capability makes it possible to fabricate the cordierite honeycomb structural body with catalyst supporting capability that is stable at high temperatures and has the high specific surface area.

(4) A new manufacturing method can be provided, making it possible to manufacture the honeycomb body in high quality at low cost.

(5) With the related art manufacturing method, the ceramic body has been manufactured to have, for instance, the cordierite honeycomb body that has inner walls coated with gamma alumina. If the cordierite honeycomb body is subjected to high temperatures, a transition occurs from gamma alumina to alpha alumina at the high temperatures above 1000° C. Moreover, the sintering effect progresses on the cordierite honeycomb body with the resultant issue of a difficulty of maintaining the high specific surface area. However, no issue arises on the product according to the present invention.

(6) With the ceramic body of the present invention formed with small heat capacity, the catalyst can be activated on an earlier stage and has less pressure loss.

Now, while the present invention will be described below in detail with reference to Examples, it will be appreciated that the present invention is not limited to such Examples described below.

EXAMPLE 1

Figure 1A:
FIG. 1A shows a TEM photograph of an acicular mullite precursor synthesized using a gel-sol method.
Figure 1B:
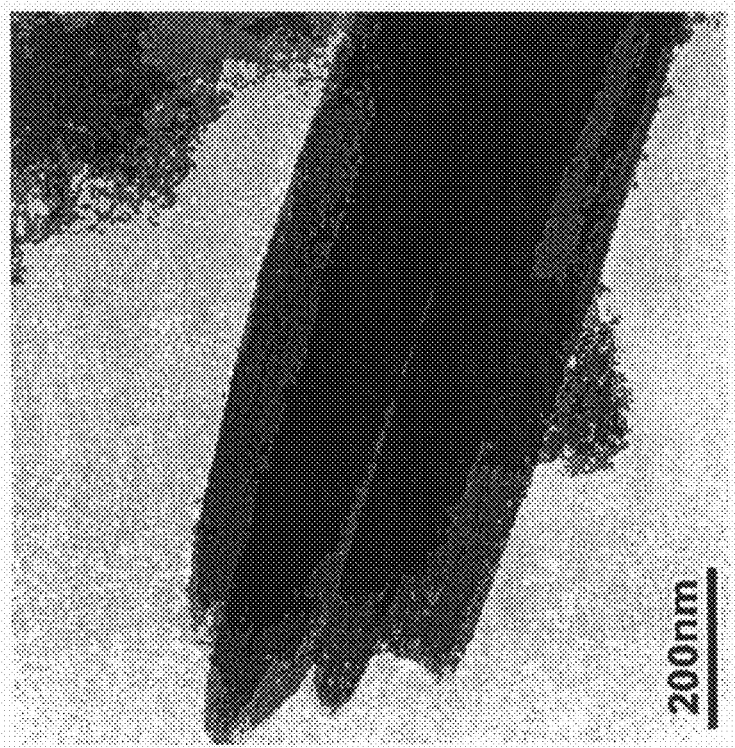
FIG. 1B shows an SEM photograph of the acicular mullite precursor synthesized using the gel-sol method.

In Example 1, aluminum isopropoxide and tetraethyl orthosilicate were weighed in a stoichiometric composition of a mullite and added to ethanol to provide a solution. The solution was stirred by a hot stirrer at a temperature of 50° C. for 24 hours and, subsequently, heated up to 80° C. Pure water was added to the solution to provide a mixed solution. Thereafter, the mixed solution was further stirred at a temperature of 80° C. for 2 hours and turned into a gel. The resulting gel was dried at a temperature of 70° C. and, then, pulverized in a mortar, thereby preparing acicular mullite precursor. A TEM (Transmission Electron Microscope) photograph and SEM (Scan Electron Microscope) photograph of the precursor are shown in FIGS. 1A and 1B.

Figure 2A:
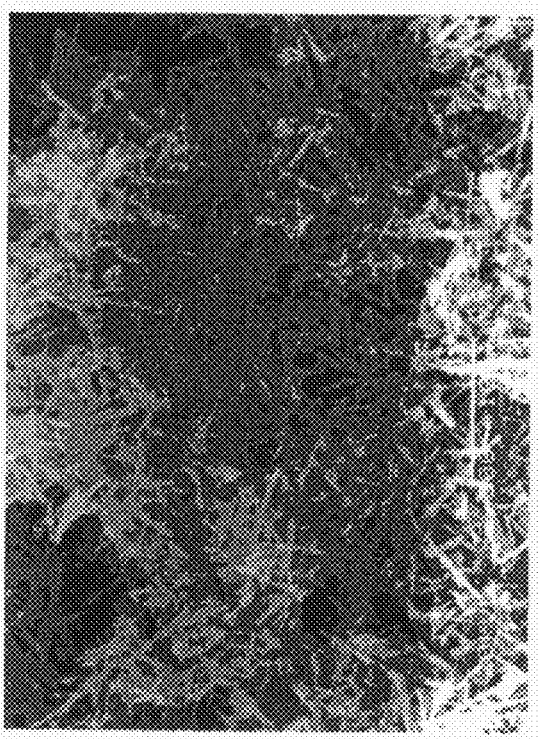
FIG. 2A shows a TEM photograph of an acicular mullite structure obtained upon firing the acicular mullite precursor in atmospheric air at a temperature of 1300° C. for 4 hours.
Figure 2B:
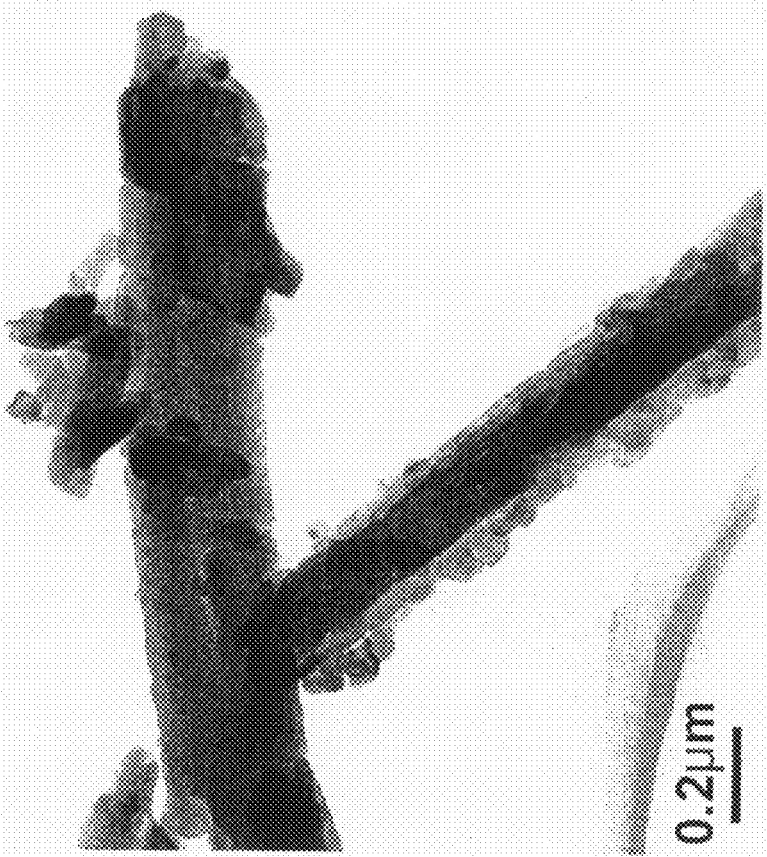
FIG. 2B shows an SEM photograph of the acicular mullite structure obtained upon firing the acicular mullite precursor in atmospheric air at the temperature of 1300° C. for 4 hours.

The resulting acicular mullite precursor was formed in a structure with fine amorphous particles. The resulting acicular mullite precursor was fired in atmospheric air at a temperature of 1300° C. for 4 hours to form acicular mullite. A TEM photograph and an SEM photograph of the resulting acicular mullite are shown in FIGS. 2A and 2B. The resulting acicular mullite crystals were composed of polycrystalline bodies in the form of fine amorphous particles shaped in finely unleveled patterns. The acicular mullite crystals, obtained in such a process, were then dispersed in ethanol, preparing mullite slurry.

Aluminum hydroxide, silica and magnesium oxide were weighed as base materials in a stoichiometric composition of cordierite. Raw material powders were mixed in a ball mill for 24 hours and, subsequently, dried and pulverized. The resulting mixture powder was formed into pellets upon uniaxial press forming, which were fired in atmospheric air at a temperature of 1350° C. for 4 hours, thereby obtaining cordierite pellets.

Figure 3A:
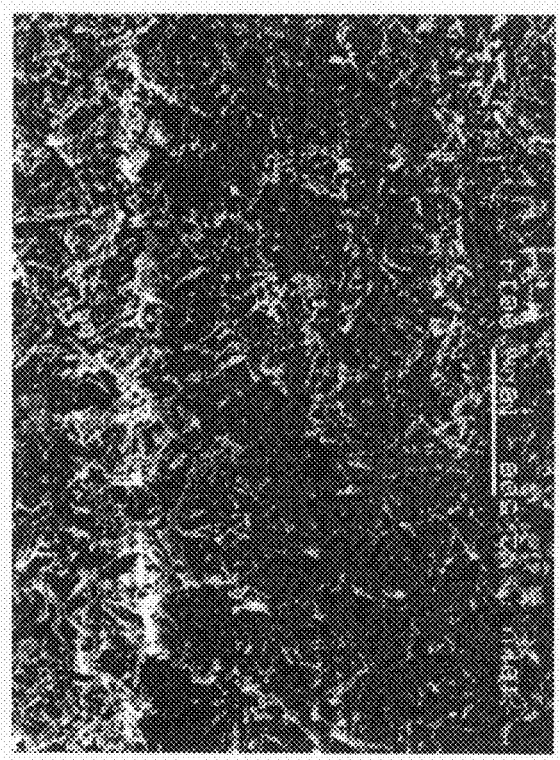
FIG. 3A shows a TEM photograph of surfaces of pellets covered with the acicular mullite obtained upon firing the acicular mullite precursor in atmospheric air at a temperature of 1350° C. for 4 hours.
Figure 3B:
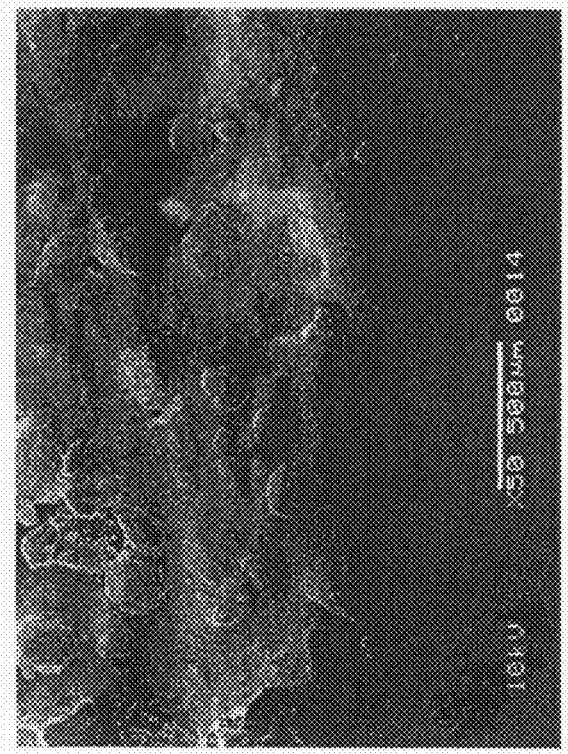
FIG. 3B shows an SEM photograph of the surfaces of the pellets covered with the acicular mullite obtained upon firing the acicular mullite precursor in atmospheric air at the temperature of 1350° C. for 4 hours.

The acicular powder slurry, prepared in the process set forth above, was applied to the cordierite pellets by dip coating. Then, the resulting cordierite pellets were fired in atmospheric air at a temperature of 1350° C. for 4 hours, thereby obtaining cordierite pellets coated with the acicular mullite. FIGS. 3A and 3B show an SEM photograph of the acicular mullite coated on the pellet surfaces. In addition, it turned out that the acicular mullite crystals were strongly bonded to the base material on a surface in contact therewith.

Aluminum isopropoxide, tetraethyl orthosilicate, magnesium ethoxide, titanium isopropoxide and ammonium metawolframate were weighed as base materials in a stoichiometric composition of cordierite and added to a given amount of ethanol to provide a solution. The solution was stirred in a hot stirrer at a temperature of 50° C. for 24 hours. Thereafter, nitric acid was added to the solution and completely dissolved.

The resulting solution was applied to the cordierite pellets coated with the acicular by dip coating. Then, the resulting cordierite pellets were dried at a room temperature and, subsequently, fired in atmospheric air at a temperature of 1350° C. for 4 hours, thereby obtaining cordierite pellets coated with the acicular mullite. Upon analyzing surfaces of the resulting pellets on an X-ray analysis, the resulting pellets were confirmed to have peaks induced by a mullite phase and a cordierite phase. In addition, as a result of elemental analyses conducted on EPMA (Electron Probe Microanalysis) and EDS (Energy Dispersive Spectrometry), it turned out that the acicular mullite surface was partly or entirely coated with cordierite.

Kaolin, talc, aluminum hydroxide and silica were used as base materials for starting materials and formulated in a cordierite composition. The cordierite materials were added with 6 wt % of methylcellulose as a binder and appropriate amounts of water. The resulting mixture was kneaded and extrusion forming was carried out to provide a compact in a honeycomb with a cell wall thickness of 100 μm, a cell density of 400 cpsi, φ of 50 mm and L of 100 mm. The compact was fired in atmospheric air at a temperature of 1400° C. for 4 hours. This honeycomb was dipped into the acicular mullite slurry of the same structure as that of Example 1 to coat the acicular mullite onto a honeycomb wall surface. The honeycomb was fired in atmospheric air at a temperature of 1350° C. for 4 hours.

Figure 4:
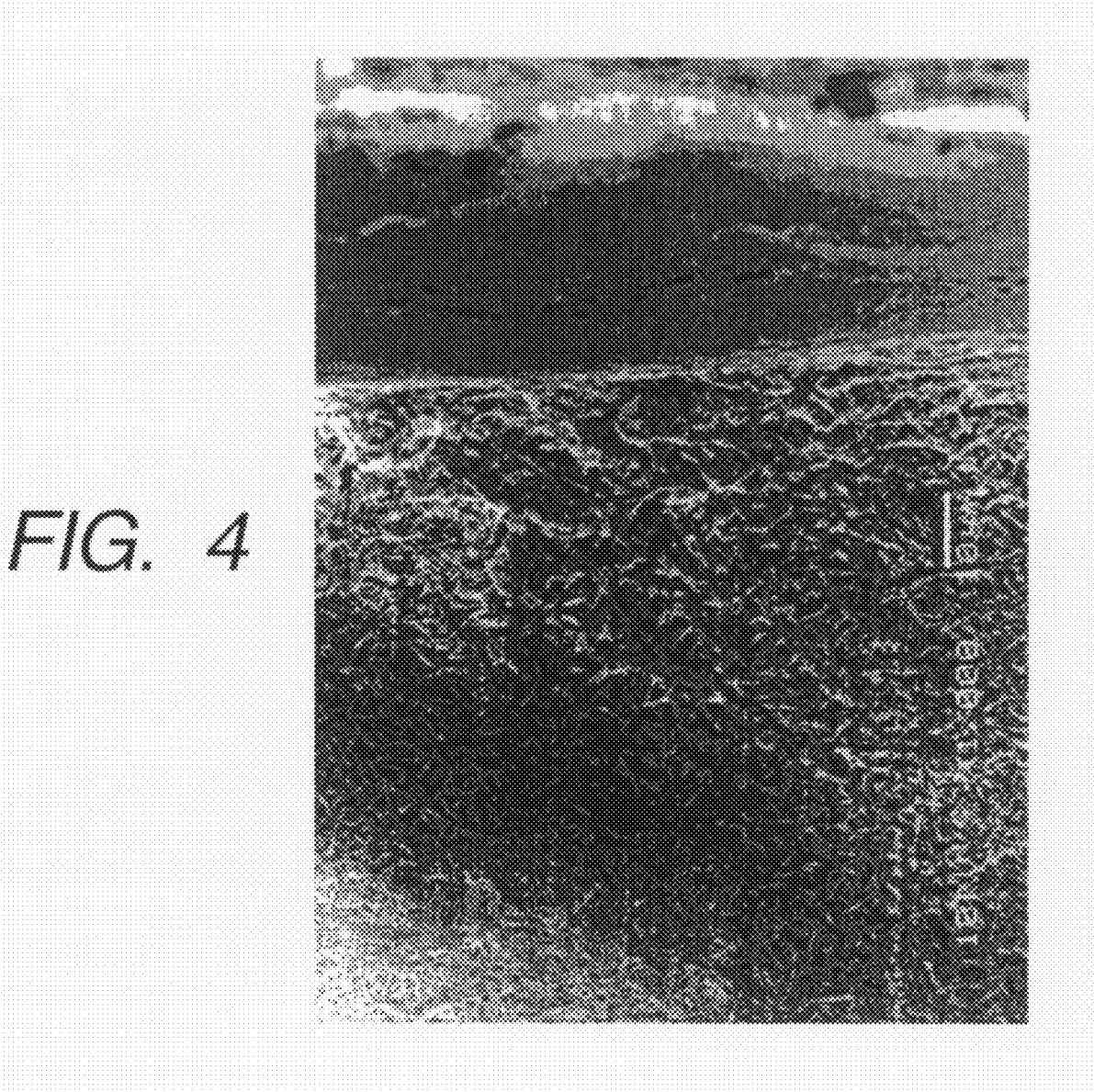
FIG. 4 shows an SEM photograph of a wall surface of a cordierite honeycomb covered with the acicular mullite obtained upon firing the acicular mullite precursor in atmospheric air at the temperature of 1350° C. for 4 hours.

Further, the honeycomb coated with the acicular mullite was dipped into the cordierite precursor solution, prepared in Example 1, and subsequently dried at a room temperature. Thereafter, the resulting honeycomb was fired in atmospheric air at a temperature of 1350° C. for 4 hours. FIG. 4 shows an SEM photograph of the cordierite honeycomb coated with the acicular mullite. The resulting honeycomb wall surface was entirely coated with the acicular mullite in the same structure as that of Example 1. As a result of elemental analyses conducted on EPMA and EDS, it turned out that the acicular mullite surface was partly or entirely coated with cordierite.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. A ceramic body for use in a fluid stream, comprising:
   a porous base material composed of a constituent element; and
   acicular particles formed on a surface of the porous base material and composed of a component different from the constituent element of the porous base material, wherein:
   the acicular particles have surfaces partly or entirely formed with coated layers.

2. The ceramic body according to claim 1, wherein:
   the acicular particles comprise polycrystalline structures each formed with a finely unleveled pattern.

3. The ceramic body according to claim 1, wherein:
the constituent element of the porous base material is cordierite.

4. The ceramic body according to claim 1, wherein:
the acicular particles are composed of mullite.

5. The ceramic body according to claim 1, wherein:
the coated layers covered on the surfaces of the acicular particles contain a substance including at least one of Si and Al elements.

6. The ceramic body according to claim 1, wherein:
the coated layers covered on the surfaces of the acicular particles contain a substance composed of cordierite.

7. The ceramic body according to claim 1, wherein:
the coated layers covered on the surfaces of the acicular particles contain a substance composed of cordierite having a crystal lattice formed of elements a part of which is replaced by at least one of W and Ti elements.

8. The ceramic body according to claim 1, wherein:
the acicular particles have an average particle diameter equal to or less than 1 μm.

9. The ceramic body according to claim 1, wherein:
the ceramic body has a shape of at least one of a powder, a pellet, a nonwoven fabric, a woven cloth, a fiber and a honeycomb.

10. A ceramic body for use in a fluid stream, comprising:
a porous base material composed of a constituent element; and
acicular particles formed on a surface of the porous base material and composed of a component different from the constituent element of the porous base material, wherein:
the porous base material has a porosity equal to or greater than 30%.

11. A ceramic body for use in a fluid stream, comprising:
a porous base material composed of a constituent element; and
acicular particles formed on a surface of the porous base material and composed of a component different from the constituent element of the porous base material, wherein:
the acicular particles have an aspect ratio equal to or greater than 5.

12. A ceramic body for use in a fluid stream, comprising:
a porous base material composed of a constituent element; and
acicular particles formed on a surface of the porous base material and composed of a component different from the constituent element of the porous base material, wherein:
the ceramic body has a specific surface area equal to or greater than 1 m$^2$/g.

13. A ceramic catalyst body comprising the ceramic body of claim 1 on which a catalyst component is supported.

14. The ceramic catalyst body according to claim 13, wherein:
the catalyst component is supported on the ceramic body by chemical bonding.

15. The ceramic catalyst body according to claim 13, wherein:
the catalyst component includes a noble metal.

16. A method of manufacturing a ceramic body, comprising the steps of:
preparing a slurry containing acicular particle source material;
preparing a porous base material;
applying the slurry onto a surface of the porous base material;
firing the porous base material, whose surface is coated with the slurry, to cause acicular particles to develop on the surface of the porous base material; and
covering a part of or a whole of surfaces of the acicular particles with a constituent element different from that of the acicular particles.

17. The method of manufacturing the ceramic body according to claim 16, wherein:
the step of preparing a slurry containing the acicular particle source material includes preparing a source component available to be developed into the acicular particles upon firing, and preparing the slurry using the source component available to be developed into the acicular particles;
the step of covering the slurry onto the surface of the porous base material includes applying the slurry onto the surface of the porous base material by dipping or coating; and
the step of firing the porous base material causes the source component, contained in the slurry coated on the surface of the porous substrate, to develop on the surface of the porous substrate as the acicular particles.

18. The method of manufacturing the ceramic body according to claim 16, wherein:
the acicular particles developed on the surface of the porous substrate include polycrystalline acicular mullite particles each formed with a finely unleveled pattern.

19. The method of manufacturing the ceramic body according to claim 16, further comprising the step of:
applying a catalyst component onto the surface of the ceramic body to be supported thereon.

20. A ceramic body for use in an exhaust gas purifying catalyst or a filter, comprising:
a cordierite porous body made of a cordierite; and
acicular particles formed on a surface of the cordierite porous body and composed of a component different from the cordierite, wherein:
the acicular particles have surfaces partly or entirely formed with coated layers.

21. The ceramic body according to claim 20, wherein:
the acicular particles comprise polycrystalline particles each formed with a finely unleveled pattern.

22. The ceramic body according to claim 20, wherein:
the cordierite porous body is composed of at least one element selected from a group consisting of kaolin, talc, alumina and silica.

23. The ceramic body according to claim 20, wherein:
the acicular particles include mullite acicular particles.

24. The ceramic body according to claim 20, wherein:
the coated layers covered on the surfaces of the acicular particles contain substances including at least one of Si and Al elements.

25. The ceramic body according to claim 20, wherein:
the coated layers covered on the surfaces of the acicular particles contain a substance composed of a cordierite.

26. The ceramic body according to claim 20, wherein:
the coated layers covered on the surfaces of the acicular particles contain a substance composed of a cordierite having a crystal lattice formed of constituent elements a part of which is replaced by at least one of W and Ti elements.

27. The ceramic body according to claim 20, wherein:
the acicular particles have an average particle diameter equal to or less than 1 μm.

28. The ceramic body according to claim 20, wherein:
the ceramic body has a shape of at least one of a powder, a pellet, a nonwoven fabric, a woven cloth, a fiber and a honeycomb.

29. A ceramic body for use in an exhaust gas purifying catalyst or a filter, comprising:
a cordierite porous body made of a cordierite; and
acicular particles formed on a surface of the cordierite porous body and composed of a component different from the cordierite, wherein:
the cordierite porous body has a porosity equal to or greater than 30%.

30. A ceramic body for use in an exhaust gas purifying catalyst or a filter, comprising:
a cordierite porous body made of a cordierite; and
acicular particles formed on a surface of the cordierite porous body and composed of a component different from the cordierite, wherein:
the acicular particles have an aspect ratio equal to or greater than 5.

31. A ceramic body for use in an exhaust gas purifying catalyst or a filter, comprising:
a cordierite porous body made of a cordierite; and
acicular particles formed on a surface of the cordierite porous body and composed of a component different from the cordierite, wherein:
the ceramic body has a specific surface area equal to or greater than 1 $m^2/g$.

32. A ceramic catalyst body including the ceramic body of claim 20 that supports thereon a catalyst component.

33. The ceramic catalyst body according to claim 32, wherein:
the catalyst component is supported on the ceramic body by chemical bonding.

34. The ceramic catalyst body according to claim 32, wherein:
the catalyst component includes a noble metal.

35. A ceramic catalyst body for use as an exhaust gas purifying catalyst, comprising:
a cordierite honeycomb structural body composed of a porous body made of a cordierite; and
polycrystalline acicular mullite particles, formed on a surface of the cordierite porous body, each of which has an unleveled pattern and supports thereon a catalyst, wherein:
the acicular mullite particles have surfaces partly or entirely formed with coated layers.

36. The ceramic catalyst body according to claim 35, wherein:
the porous body includes at least one element selected from a group consisting of kaolin, talc, alumina and silica.

37. The ceramic catalyst body according to claim 35, wherein:
the coated layers covered on the surfaces of the acicular mullite particles contain substances including at least one of Si and Al elements.

38. The ceramic catalyst body according to claim 35, wherein:
the coated layers covered on the surfaces of the acicular mullite particles contain a substance composed of a cordierite.

39. The ceramic catalyst body according to claim 35, wherein:
the coated layers covered on the surfaces of the acicular mullite particles contain a substance composed of a cordierite having a crystal lattice formed of constituent elements a part of which is replaced by at least one of W and Ti elements.

40. The ceramic catalyst body according to claim 35, wherein:
the polycrystalline acicular mullite particles have an average particle diameter equal to or less than 1 μm.

41. The ceramic catalyst body according to claim 35, wherein:
the ceramic catalyst body has a shape of at least one of a powder, a pellet, a nonwoven fabric, a woven cloth, a fiber and a honeycomb.

42. A ceramic catalyst body for use as an exhaust gas purifying catalyst, comprising:
a cordierite honeycomb structural body composed of a porous body made of a cordierite; and
polycrystalline acicular mullite particles, formed on a surface of the cordierite porous body, each of which has an unleveled pattern and supports thereon a catalyst, wherein:
the porous body has a porosity equal to or greater than 30%.

43. A ceramic catalyst body for use as an exhaust gas purifying catalyst, comprising:
a cordierite honeycomb structural body composed of a porous body made of a cordierite; and
polycrystalline acicular mullite particles, formed on a surface of the cordierite porous body, each of which has an unleveled pattern and supports thereon a catalyst, wherein:
the polycrystalline acicular mullite particles have an aspect ratio equal to or greater than 5.

44. A ceramic catalyst body for use as an exhaust gas purifying catalyst, comprising:
a cordierite honeycomb structural body composed of a porous body made of a cordierite; and
polycrystalline acicular mullite particles, formed on a surface of the cordierite porous body, each of which has an unleveled pattern and supports thereon a catalyst, wherein:
the ceramic catalyst body has a specific surface area equal to or greater than 1 $m^2/g$.

45. A method of manufacturing a ceramic catalyst body, comprising the steps of:
preparing a slurry composed of a solution dispersed with acicular mullite particles;
preparing a cordierite porous base material;
applying the slurry onto a surface of the cordierite porous base material;
firing the cordierite porous base material, whose surface is coated with the slurry, to cause acicular mullite particles to develop on the surface of the cordierite porous base material for thereby providing a catalyst carrier having a surface formed with the acicular mullite particles;
applying a part of or a whole of surfaces of the acicular mullite particles with a component different from the acicular mullite particles; and
supporting a catalyst on the catalyst carrier.

46. The method of manufacturing the ceramic catalyst body according to claim 45, wherein:
the step of preparing the slurry includes preparing a source component that can be formed into the acicular mullite particles, and preparing the slurry using the source component that can be formed into the acicular mullite particles;

the step of applying the slurry onto the surface of the porous base material includes coating the slurry onto the surface of the cordierite porous base material by dipping or coating; and the step of firing the porous base material causes the source component, contained in the slurry coated on the surface of the porous substrate, to develop on the surface of the porous substrate as the acicular mullite particles.

47. The method of manufacturing the ceramic catalyst body according to claim 46, wherein:

the step of preparing the source component comprises preparing a solution of an alkoxide, selected from a group consisting of aluminum isoproxide and tetraethyl orthosilicate, which is weighed in a stoichiometric composition of mullite, stirring and heating the solution of the alkoxide to prepare a sol-gel, drying the sol-gel to obtain a dried product, pulverizing the dried product to obtain an acicular mullite precursor, and heating the acicular mullite precursor at a given temperature for crystallization to obtain a polycrystalline acicular mullite particles as the source component.

48. The method of manufacturing the ceramic catalyst body according to claim 47, wherein:

the polycrystalline acicular mullite particles have an average particle diameter equal to or less than 1 μm.

49. The method of manufacturing the ceramic catalyst body according to claim 47, wherein:

the polycrystalline acicular mullite particles have an aspect ratio equal to or greater than 5.

50. The method of manufacturing the ceramic catalyst body according to claim 45, wherein:

the acicular mullite particles developed on the surface of the cordierite porous substrate include polycrystalline acicular mullite particles each formed with a finely unleveled pattern.

51. The method of manufacturing the ceramic catalyst body according to claim 45, further comprising the step of:

applying a catalyst component onto the surface of the ceramic body to be supported thereon.

52. The method of manufacturing the ceramic catalyst body according to claim 45, wherein:

the step of preparing the cordierite porous base material comprises preparing base materials including kaolin, talc, alumina and silica powders as starting powders which are blended in a cordierite composition, adding a pore-forming powder to the base materials; mixing the starting powders and the pore-forming powder to form a mixture slurry, drying the mixture slurry to form a dried product; pulverizing the dried product to form a source powder; pressing the source powder into a compact; and firing the compact at a given temperature to form a sintered body as the cordierite porous base material.

53. The method of manufacturing the ceramic catalyst body according to claim 45, wherein:

the step of preparing the acicular mullite particles comprises preparing alkoxides capable of forming aluminum and silica components, blending the alkoxides in a mullite composition, preparing a source slurry composed of a solution dispersed with the alkoxides, stirring the source slurry while heating the same, preparing a gel of the source slurry, drying the gel of the source slurry to form a dried gel, pulverizing the dried gel to form an acicular mullite precursor, and heating the acicular mullite precursor at a given temperature to obtain a polycrystalline acicular mullite.

54. The method of manufacturing the ceramic catalyst body according to claim 53, wherein:

the step of applying the part of or the whole of the surfaces of the acicular mullite particles with the component different from the acicular mullite particles comprises preparing a cordierite containing slurry, applying the cordierite containing slurry onto the surfaces of the acicular mullite particles, and firing the cordierite containing slurry to allow a cordierite substance to be formed on the surfaces of the acicular mullite particles as a first catalyst supportable substance.

55. The method of manufacturing the ceramic catalyst body according to claim 54, wherein:

the step of applying the part of or the whole of the surfaces of the acicular mullite particles with the component different from the acicular mullite particles further comprises preparing a catalyst supportable component slurry, applying the catalyst supportable component slurry onto the cordierite substance formed on the surfaces of the acicular mullite particles, and firing the catalyst supportable component slurry to form a second catalyst supportable substance.

56. The method of manufacturing the ceramic catalyst body according to claim 55, wherein:

the second catalyst supportable substance includes at least one element selected from the group consisting of Cr, Mo, W, Go, Ti, Fe, Ga and Ni and oxides thereof.

* * * * *